US012508622B2

(12) United States Patent
Marleau-Finley

(10) Patent No.: US 12,508,622 B2
(45) Date of Patent: Dec. 30, 2025

(54) INTERNAL SURFACE TREATMENT DEVICE FOR HOLLOW ENGINE SHAFT AND THE LIKE

(71) Applicant: PRATT & WHITNEY CANADA CORP., Longueuil (CA)

(72) Inventor: Julien Marleau-Finley, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 199 days.

(21) Appl. No.: 18/153,394

(22) Filed: Jan. 12, 2023

(65) Prior Publication Data

US 2024/0238833 A1 Jul. 18, 2024

(51) Int. Cl.
*B05C 7/08* (2006.01)
*B05C 1/06* (2006.01)
*B05C 11/02* (2006.01)

(52) U.S. Cl.
CPC .................. *B05C 7/08* (2013.01); *B05C 1/06* (2013.01); *B05C 11/021* (2013.01)

(58) Field of Classification Search
USPC ................. 118/306, 317, 313, 315, 264, 105
See application file for complete search history.

(56) References Cited

U.S. PATENT DOCUMENTS

| | | | | |
|---|---|---|---|---|
| 1,455,065 | A * | 5/1923 | Bellows | B05C 7/08 118/DIG. 10 |
| 1,746,071 | A | 2/1930 | Cotton | |
| 3,007,810 | A | 11/1961 | Hobrock | |
| 3,111,431 | A | 11/1963 | Weaver | |
| 3,885,521 | A | 5/1975 | von Arx | |
| 4,108,279 | A * | 8/1978 | Marcell | B05C 7/08 15/104.16 |
| 10,828,661 | B2 | 11/2020 | Lokkinen | |

FOREIGN PATENT DOCUMENTS

| | | | | |
|---|---|---|---|---|
| JP | 2001239200 A | 9/2001 | | |
| WO | WO-2008037755 A1 * | 4/2008 | | B05B 1/265 |

* cited by examiner

*Primary Examiner* — Yewebdar T Tadesse
(74) *Attorney, Agent, or Firm* — NORTON ROSE FULBRIGHT CANADA LLP

(57) ABSTRACT

A surface treatment device for applying a surface treatment to an inner surface of a hollow engine shaft includes a supply of a surface treatment agent and an elongated rod extending from a proximal end to a distal end. The elongated rod has an inner passage extending from the proximal end to the distal end. The proximal end has an inlet fluidly coupled to the supply of the surface treatment agent. The inner passage terminates at an outlet at the distal end. The elongated rod is insertable inside the hollow engine shaft. An applicator is disposed at the distal end of the elongated rod adjacent the outlet. The applicator is engageable with the inner surface of the hollow engine shaft for applying the surface treatment agent from the supply of the surface treatment agent to the inner surface of the hollow engine shaft.

4 Claims, 7 Drawing Sheets

INTERNAL SURFACE TREATMENT DEVICE FOR HOLLOW ENGINE SHAFT AND THE LIKE

TECHNICAL FIELD

The disclosure relates to a device and a method for applying a surface treatment, such as paint, to the inner surface of hollow engine shafts and the like.

BACKGROUND

Hollow shafts used for aircraft engines and the like may be coated. For instance, these shafts may be painted to prevent corrosion. Due to their size, access to the inner surface of these shafts may be limited, and known techniques for protecting the outer shaft surfaces, for instance via paint guns, may not be suitable.

SUMMARY

In one aspect, there is provided a surface treatment device for applying a surface treatment to an inner surface of a hollow engine shaft, comprising a supply of a surface treatment agent, an elongated rod extending from a proximal end to a distal end, the elongated rod having an inner passage extending from the proximal end to the distal end, the proximal end having an inlet fluidly coupled to the supply of the surface treatment agent, the inner passage terminating at an outlet at the distal end, the elongated rod insertable inside the hollow engine shaft, and an applicator disposed at the distal end of the elongated rod adjacent the outlet, the applicator engageable with the inner surface of the hollow engine shaft for applying the surface treatment agent from the supply of the surface treatment agent to the inner surface of the hollow engine shaft.

In another aspect, there is provided a coating rod for applying a coating liquid to an inner surface of a hollow engine shaft, comprising an elongated body extending longitudinally from a first end to a second end, the elongated body sized and configured for axial insertion inside the hollow engine shaft, an inner passage extending longitudinally through the elongated body, the inner passage having a coating inlet at the first end and a coating outlet at the second end, and a coating applicator disposed at the second end adjacent the coating outlet.

In a further aspect, there is provided a method for treating an inner surface of a hollow engine shaft, comprising engaging an elongated rod inside the hollow engine shaft, the elongated rod having a distal end carrying an applicator, directing a surface treatment agent through an inner passage of the elongated rod towards the distal end, releasing the surface treatment agent from an outlet of the inner passage of the elongated rod inside the hollow engine shaft, and spreading the surface treatment agent along the inner surface of the hollow engine shaft with the applicator.

BRIEF DESCRIPTION OF THE DRAWINGS

Reference is now made to the accompanying figures in which.

DETAILED DESCRIPTION

Figure 1:
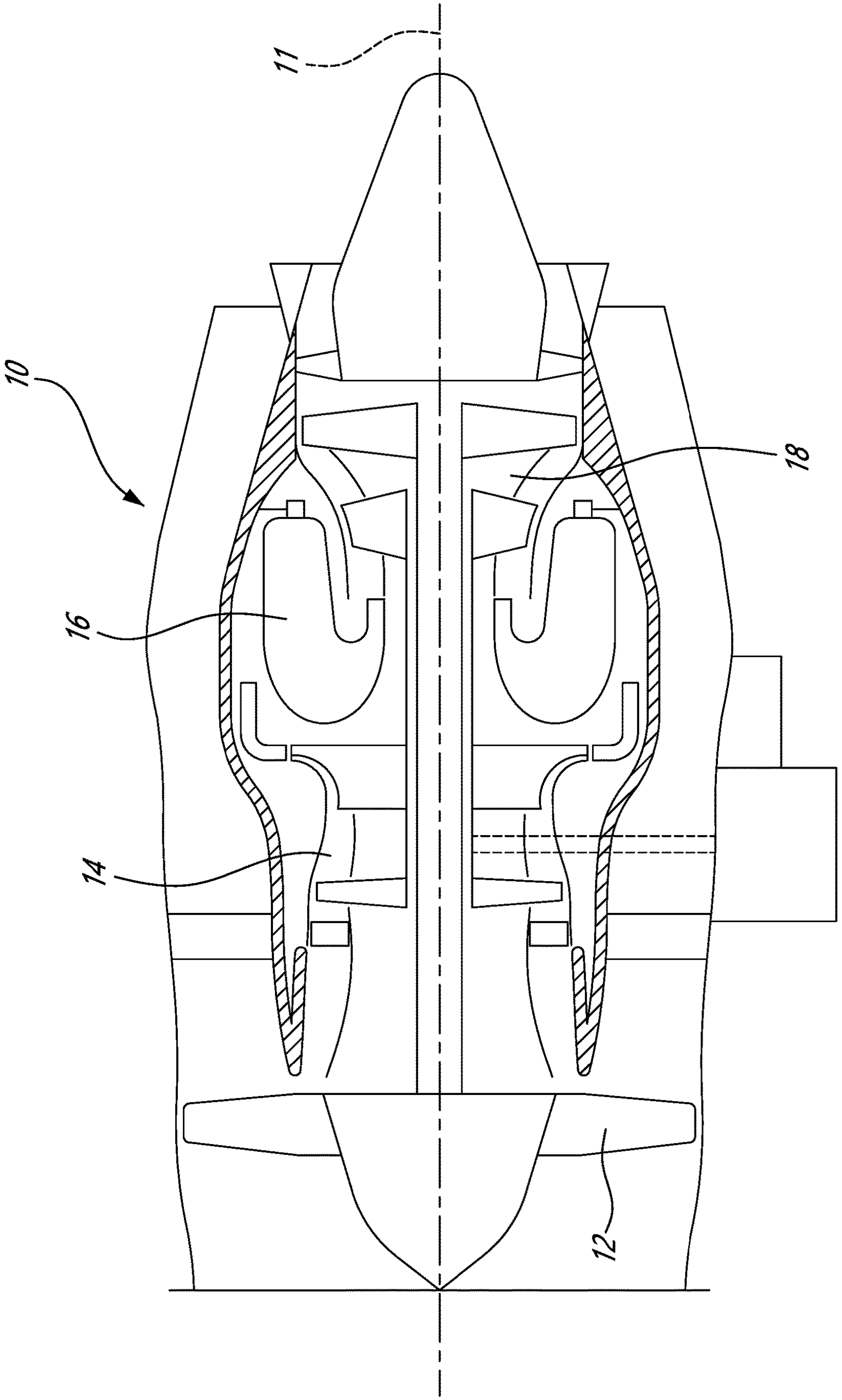
FIG. 1 is a schematic cross sectional view of a gas turbine engine.

FIG. 1 illustrates a gas turbine engine 10 of a type preferably provided for use in subsonic flight, generally comprising in serial flow communication, along central longitudinal axis 11, a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. While the depicted engine 10 is a turbofan engine, the present disclosure is applicable to other types of engines, such as turbojet, turboprop, and turboshaft engines, as well as hybrid-electric engines.

Figure 2:
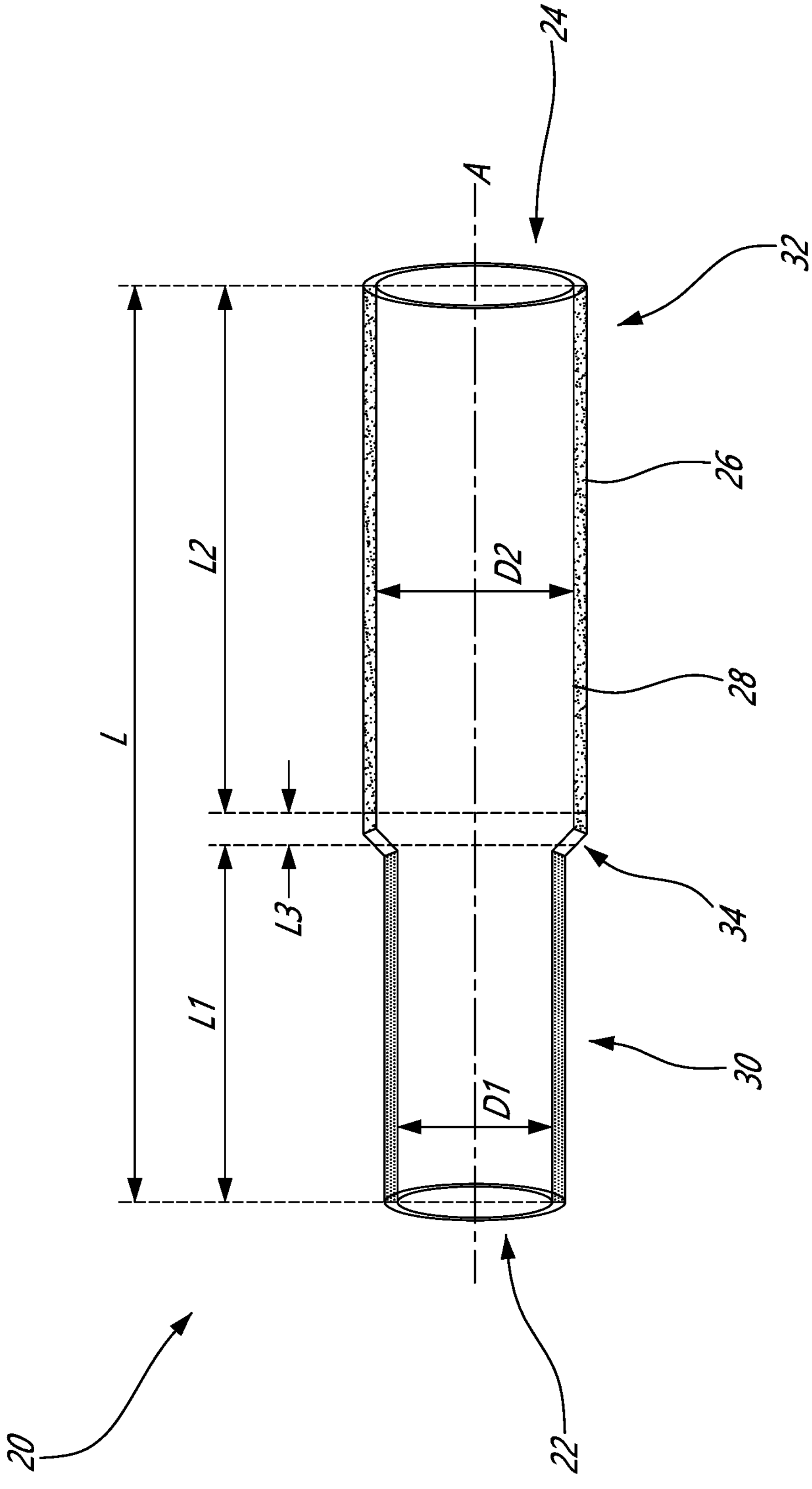
FIG. 2 is a schematic cross sectional view of an exemplary shaft for the engine of FIG. 1.

Referring to FIG. 2, an exemplary hollow shaft 20 used in the engine 10 is shown. Shaft 20 may be, for instance, a main shaft for the engine 10, a power turbine shaft for the turbine section 18, or a low pressure shaft drivingly coupling a low pressure compressor of the compressor section 14 to a low pressure turbine of the turbine section 18. Other hollow shafts of the engine 10 may be contemplated. The shaft 20 may be made from steel or other like materials. Other materials may be contemplated as well. The shaft 20 extends along a shaft longitudinal axis A from a first end 22 to a second end 24. The shaft 20 has a hollow cylindrical body with an outer surface 26 and an inner surface 28 radially disposed within the outer surface 26.

In the shown case, the shaft 20 is made up of two sections having inner surfaces 28 with different inner diameters: a first section 30 of axial length L1 having a first inner diameter D1, and a second section 32 of axial length L2 having a second inner diameter D2 for its inner surface 28. A transition portion 34 of axial length L3, for instance a tapered or frustoconical portion, joins the first section 30 to the second section 32. An overall axial length L of the shaft 20 may include the first section axial length L1, the second section axial length L2, and the transition portion axial length L3. In the shown case, the second inner diameter D2 is greater in magnitude than the first inner diameter D1, although the opposite arrangement may be contemplated. Similarly, in the shown case, the second section axial length L2 is greater in magnitude than the first section axial length L1, although the opposite may be contemplated.

Various combinations of diameters and lengths for each section 30, 32 may be contemplated. While the shown shaft 20 includes two main sections 30, 32, the present disclosure is applicable to shafts 20 with other numbers of sections having different inner diameters, for instance three or more sections of different axial lengths and inner diameters. Similarly, the present disclosure is applicable to a shaft 20 having a constant inner diameter along its axial length (i.e., a single section shaft). In some cases, the shaft 20 may have an axial length L ranging from 20 to 80 inches long, with an inner diameter ranging from 0.360 to 1.400 inches. Other shaft lengths and diameters may be contemplated.

Figure 3:
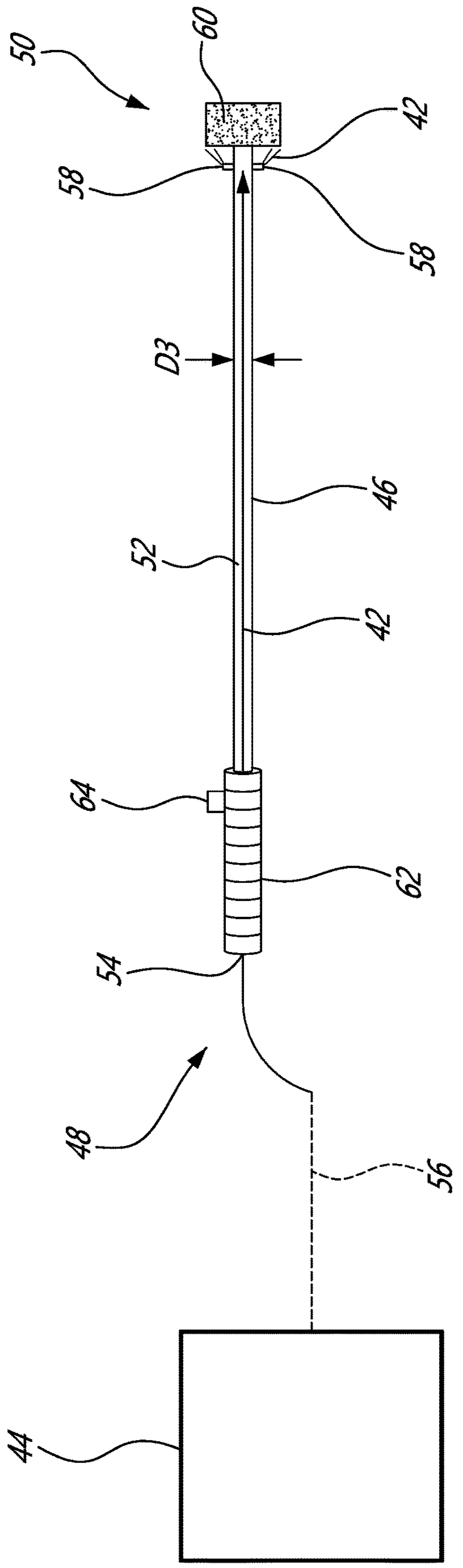
FIG. 3 is a schematic cross sectional view of a surface treatment device according to an embodiment of the present disclosure.

Referring additionally to FIG. 3, a surface treatment device 40 is shown for applying a surface treatment agent 42 (e.g., paint/liquid coating) stored in a surface treatment supply 44 to an inner surface 28 of a shaft 20, for instance the shaft 20 of FIG. 2, according to one or more embodiments of the present disclosure. Still according to one or more embodiments, the surface treatment agent 42 may be paint, with the surface treatment device 40 operable to apply a uniform layer or coating of paint to the inner surface 28 of the shaft 20 to protect the inner surface 28 of the shaft from corrosion. Other surface treatment agents 42 may be contemplated, for instance protective liquid coatings, such as a rust-proofing coating.

The surface treatment device 40 depicted in FIG. 3 includes an elongated rod 46, also referred to as a coating rod, having an elongated body of diameter D3 extending longitudinally from a proximal end 48 (also referred to as a first end) to a distal end 50 (also referred to as a second end), with an inner passage 52 extending longitudinally centrally through the elongated rod 46 from the proximal end 48 to the distal end 50. At the proximal end 48, there is an inlet 54 (also referred to as a coating inlet) to the inner passage 52 fluidly coupled to the surface treatment supply 44, illustratively via a flexible conduit or hose 56. At the distal end 50, the inner passage 52 terminates at an outlet (also referred to as a coating outlet), for instance one or more nozzles 58 (illustratively two nozzles 58). Other types of outlets may be contemplated, as will be discussed in further detail below. The surface treatment agent 42 (e.g., the paint or liquid coating substance) is shown as flowing through the inner passage 52, defining a general surface treatment flow direction from the proximal end 48 to the distal end 50.

An applicator 60 (also referred to as a coating applicator) is disposed at the distal end 50 adjacent the outlet (nozzles 58 in FIG. 3), illustratively downstream of the outlet. As such, the surface treatment device 40 is operable for treating or coating the inner surface 28 of the exemplified engine shaft 20 by supplying the surface treatment agent 42, from the supply 44, through the inner passage 52 of the elongated rod 46 to the applicator 60 at the distal end 50 thereof to apply the surface treatment agent 42 to the inner surface 28. The rod diameter D3 may be sized to be smaller in magnitude than the smallest of the hollow shaft 20 interior diameters, illustratively D1 in the shaft 20 shown in FIG. 2, so that the elongated rod 46 may be easily inserted into the hollow shaft 20 along shaft axis A.

The elongated rod 46 may be made from, for instance, steel, aluminum, or a hard plastic. Other materials may be contemplated as well. In the shown case, the device 40 includes a handle 62 at the proximal end 48 with one or more control buttons 64 (e.g., push-button or trigger) for controlling the delivery of the surface treatment agent 42 from the surface treatment supply 44 to the applicator 60. Various delivery means from the supply 44 to the elongated rod 46 may be contemplated, for instance manual or automatic pumps.

As the surface treatment agent 42 may be continuously supplied to the applicator 60, the applicator 60 may apply a consistent layer of surface treatment agent 42 (e.g., a consistent paint or coating thickness) along the axial length L of the shaft 20. As such, the uniformity of a painting/coating process for a given shaft 20, as well as the repeatability of a painting/coating process for different shaft sections 30, 32 or for multiple shafts 20, may be improved. For instance, a thickness of the coating liquid, for instance paint, may be consistent along the axial length L of the shaft 20 (i.e., minimal variation of the thickness along the axial length L). In some cases, the desired coating thickness may range from 0.015 to 0025 inches. Other coating thicknesses may be contemplated, for instance based on the material of the shaft 20 and the type of liquid coating applied as the surface treatment agent 42.

In the embodiment shown in FIG. 3, the surface treatment device 40 includes a single applicator 60 mounted to the distal end 50 of the elongated rod 46, although the number of applicators 60 may vary. In the shown case, the applicator 60 is a sponge, i.e., an applicator 60 able to expand and contract based on its surroundings. Other applicators 60 may be contemplated, for instance a brush. The porosity of the sponge may vary, for instance based on a desired final paint texture on the inner surface 28. The sponge may be sized to span a greater diameter than the greatest inner diameter of the hollow shaft 20 (illustratively D2 of the hollow shaft 20 of FIG. 2) and be compressible to easily slide within the section of the hollow shaft 20 having the smallest inner diameter (illustratively D1 of the hollow shaft 20 of FIG. 2). As such, the wet or saturated sponge may apply the surface treatment agent 42 in all directions to the inner surface 28, providing a consistent application of the surface treatment agent 42. Such application may be accomplished, for instance, via a reciprocating motion of the elongated rod 46 along the shaft axis A, with additional surface treatment agent 42 being provided to the applicator 60 (e.g., to the compressed sponge) as needed.

In the embodiment shown in FIG. 3, two nozzles 58 are disposed at the distal end 50 of the elongated rod 46, upstream of the applicator 60 relative to a flow direction of the surface treatment agent 42 through the inner passage 52 and aimed downstream towards the applicator 60. Other arrangements may be contemplated, for instance the nozzles 58 disposed downstream of the applicator 60 and aimed upstream towards the applicator 60. In the shown case, the nozzles 58 are aimed directly at the applicator 60. The nozzles 58 are therefore operable to deliver surface treatment agents 42, such as paint and liquid coating, directly to the applicator 60 (i.e., to wet or saturate the applicator 60) so that the applicator 60 may be used to coat the inner surface 28 of the shaft 20. The flowable surface treatment agent 42 may be provided to the applicator 60 as needed, for instance via button(s) 64, so that the applicator 60 is constantly saturated at a desired level to coat the inner surface 28 at a consistent thickness along its length L. In other cases, the nozzle(s) 58 may be aimed radially outwardly, i.e. towards the inner surface 28 of the shaft 20 directly. In such cases, the applicator 60 may be used to spread the surface treatment agent 42 that is sprayed onto the inner surface 28 by the nozzle(s) 58.

Figure 4:
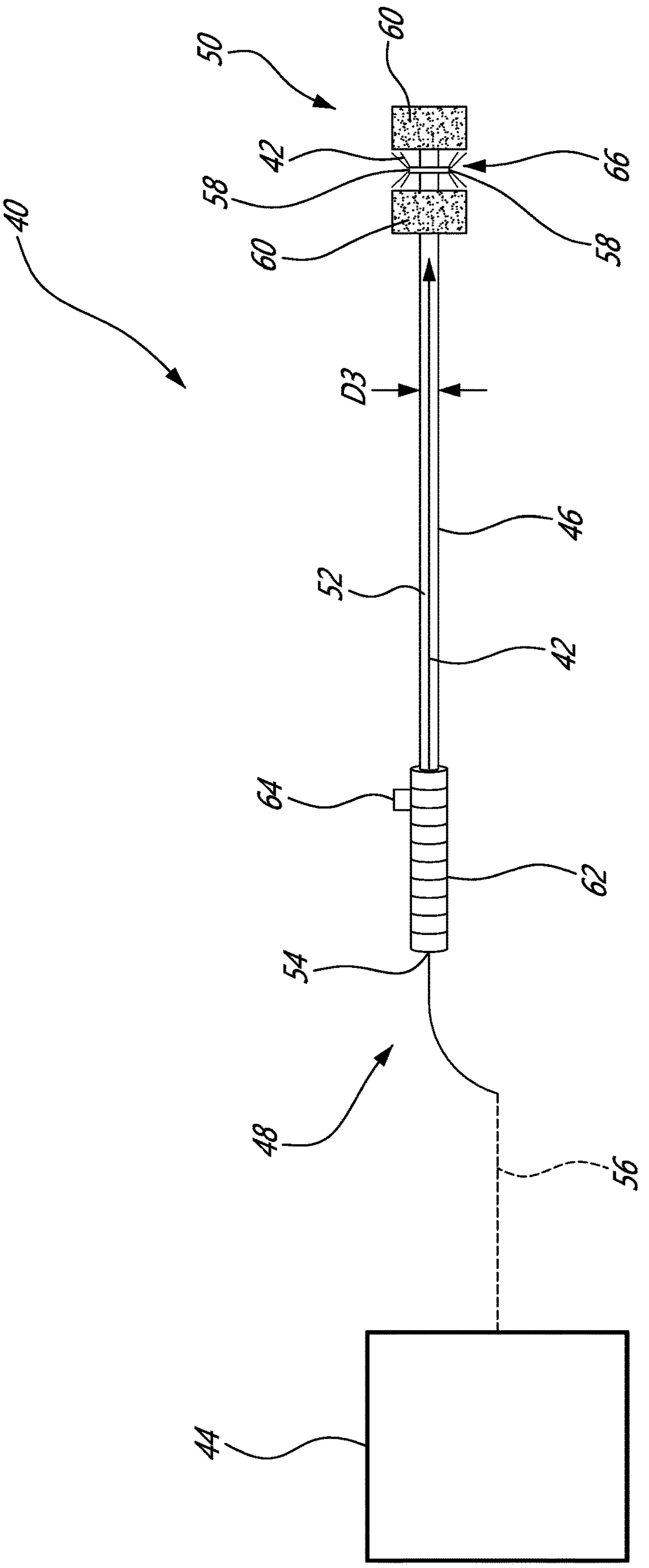
FIG. 4 is a schematic cross sectional view of a surface treatment device according to another embodiment of the present disclosure.

Referring to FIG. 4, another embodiment of a surface treatment device 40 is shown, with like reference numerals referring to like elements. In this embodiment, two applicators 60 are disposed at the distal end 50 of the elongated rod 46, one in front of the other, with an axial gap 66 disposed therebetween. Nozzles 58, illustratively four nozzles 58, are disposed in the axial gap 66 and are aimed towards the applicators 60. Illustratively, two nozzles 58 are aimed towards the upstream applicator 60, while two nozzles 58 are aimed towards the downstream applicator 60. Other numbers and directions of nozzles 58 may be contemplated, for instance nozzles 58 operable to spray coating liquid in both upstream and downstream directions. As such, an axial width of the gap 66 may vary.

The surface treatment device 40 of FIG. 4 is therefore operable to coat/paint the inner surface 28 of the shaft 20 via two distinct applicators 60. This may increase the surface area of the inner surface 28 that may be coated in each stroke of the elongated rod 46. Other numbers of applicators 60 and nozzles 58 may be contemplated. For instance, one larger (i.e., occupying a larger axial length along the elongated rod 46) applicator 60 may be disposed towards the distal end 50 of the elongated rod 46, with one or more nozzles 58 disposed on the elongated rod 46 on both upstream and downstream sides of the applicator 60. In other cases, the one or more nozzles 58 may be aimed radially outwardly, i.e. towards the inner surface 28 of the shaft 20 directly. In such cases, the applicators 60 may be used to spread the surface treatment agent 42 that is sprayed onto the inner surface 28 by the nozzle(s) 58.

Figure 5C:
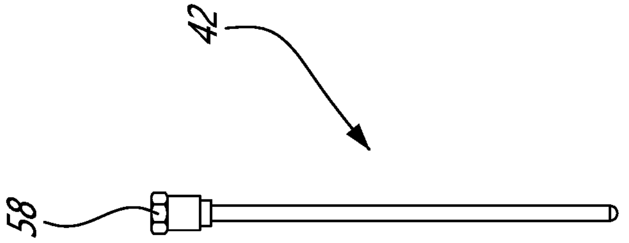
FIGS. 5A-5C are schematic representations of exemplary nozzles for the surface treatment devices of FIGS. 3-4.
Figure 5B:
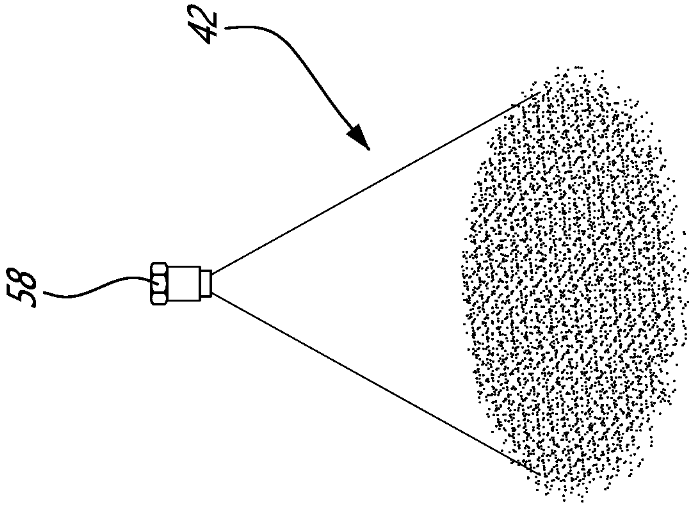
Figure 5A:
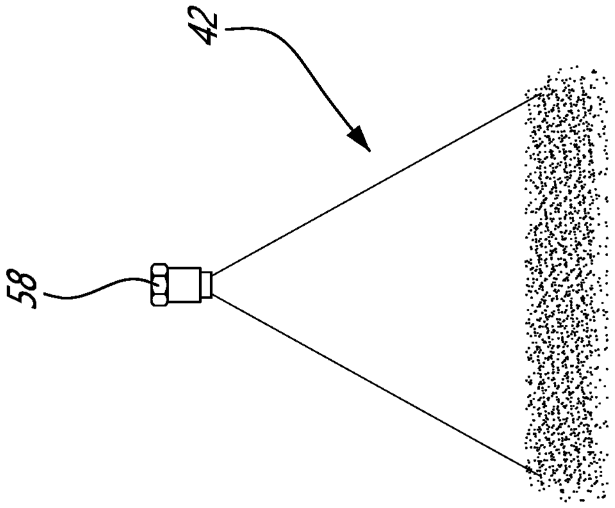

Referring to FIGS. 5A-5C, three exemplary nozzles 58 for the surface treatment device 40 of FIGS. 3 and 4 are shown. The nozzle 58 of FIG. 5A distributes the surface treatment agent 42 in a flat fan distribution pattern. The nozzle 58 of FIG. 5B distributes the surface treatment agent 42 in a conical distribution pattern. The nozzle 58 of FIG. 5C distributes the surface treatment agent in a straight distribution manner, i.e., a single point distribution. Other nozzle types may be contemplated as well. The nozzle selection may depend, for instance, on the number of applicators 60, the positioning of the nozzle(s) 58 relative to the applicator(s) 60, and whether the nozzles 58 are to distribute the surface treatment agent 42 to the applicator(s) 60 themselves or directly to the inner surface 28 of the shaft 20. Other considerations may play a role in determining the nozzle type selection as well.

Figure 6:
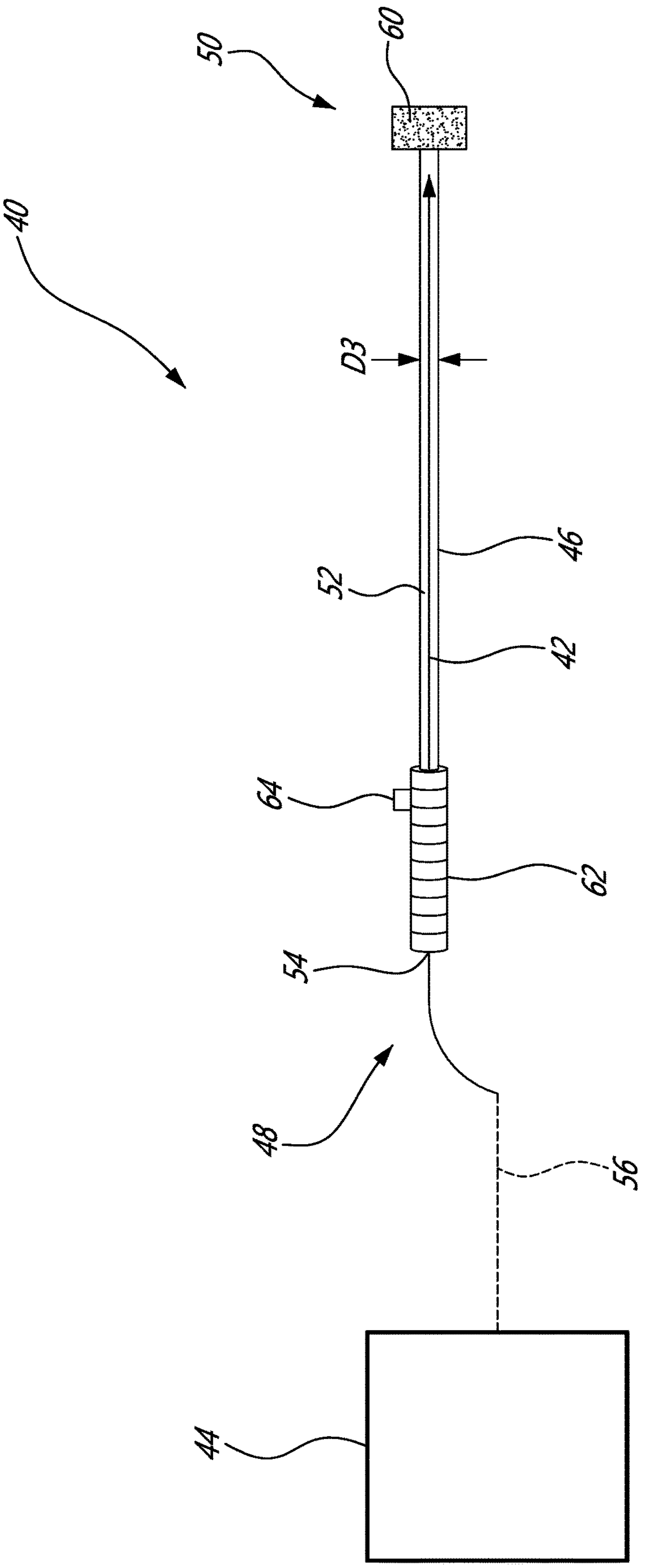
FIG. 6 is a schematic cross sectional view of a surface treatment device according to an embodiment of the present disclosure.

Referring additionally to FIG. 6, another embodiment of a surface treatment device 40 for applying a surface treatment agent 42 stored in a surface treatment supply 44 to the inner surface 28 of the shaft 20 is shown, with like reference numerals referring to like elements. In this embodiment, the outlet of the inner passage 52 at the distal end 50 of the elongated rod 46 is directly fluidly coupled to the applicator 60. Stated differently, the inner passage 52 terminates, at the distal end 50, directly at the applicator 60 such that the surface treatment 42 from the surface treatment supply 44 is supplied, via the inner passage 52, directly to the applicator 60. Control of the surface treatment agent delivery may be controlled, for instance, via control button(s) 64 on the handle 62. In this embodiment, a user may wet or saturate the applicator 60 to a desired degree before using the applicator to coat the inner surface 28 of the shaft 20, applying additional coating as required for even distribution (i.e., coating thickness) along the inner surface 28.

Figure 7:
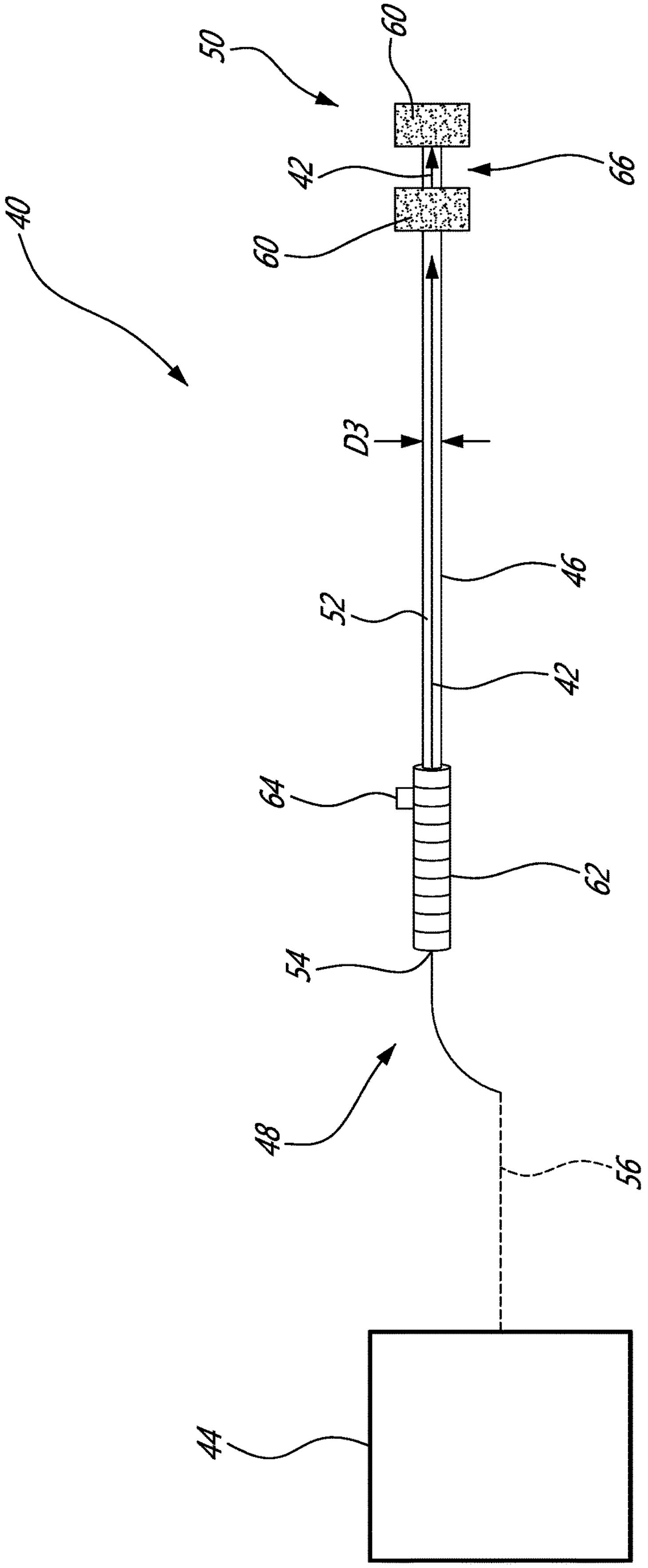
FIG. 7 is a schematic cross sectional view of a surface treatment device according to a further embodiment of the present disclosure.

Referring to FIG. 7, another embodiment of the surface treatment device 40 is shown, with like reference numerals referring to like elements. In this embodiment, two applicators 60 are disposed at the distal end 50 of the elongated rod 46, one in front of the other, with an axial gap 66 disposed therebetween. As was the case in the embodiment of FIG. 6, the inner passage 52 leads directly to each of the applicators 60 at the distal end 50. For instance, the inner passage 52 may branch into two at the upstream applicator 60, with a portion of the surface treatment agent 42 directed through a first outlet at the upstream applicator 60 with another portion of the surface treatment agent 42 continuing downstream through the inner passage 52 to a second outlet at the downstream applicator 60. The surface treatment device 40 of FIG. 7 is therefore operable to coat the inner surface 28 of the shaft 20 via two distinct applicators 60 receiving the surface treatment agent 42 directly from the inner passage 52 extending through the elongated rod 46.

According to the present disclosure, there is taught an exemplary method for treating an inner surface 28 of a hollow engine shaft 20 of an aircraft engine 10. An elongated rod 46 is engaged inside the hollow engine shaft 20, the elongated rod 46 having a distal end 50 carrying an applicator 60. A surface treatment agent 42 is directed through of an inner passage 52 of the elongated rod 46 towards the distal end 50. The surface treatment agent 42 is released from the outlet of the inner passage 52 of the elongated rod 46 inside the hollow engine shaft 20. The surface treatment agent 42 is spread along the inner surface 28 of the hollow engine shaft 20 with the applicator 60.

It can be appreciated that at least some embodiments have a surface treatment device with an elongated rod having an inner passage passing therethrough to deliver a surface treatment agent (e.g., a coating liquid) to an applicator at a distal end thereof, thereby allowing for improved uniformity and repeatability in applying coating liquids/paint to the inner surfaces of hollow engine shafts.

In the present disclosure, when a specific numerical value is provided (e.g. as a maximum, minimum or range of values), it is to be understood that this value or these ranges of values may be varied, for example due to applicable manufacturing tolerances, material selection, etc. As such, any maximum value, minimum value and/or ranges of values provided herein (such as, for example only, the shaft having an axial length ranging from 20 to 80 inches), include(s) all values falling within the applicable manufacturing tolerances. Accordingly, in certain instances, these values may be varied by ±5%. In other implementations, these values may vary by as much as ±10%. A person of ordinary skill in the art will understand that such variances in the values provided herein may be possible without departing from the intended scope of the present disclosure, and will appreciate for example that the values may be influenced by the particular manufacturing methods and materials used to implement the claimed technology.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A surface treatment device for applying a surface treatment to an inner surface of a hollow engine shaft, comprising:

a supply of a surface treatment agent;

an elongated rod extending along an axis from a proximal end to a distal end, the elongated rod having an inner passage extending from the proximal end to the distal end, the proximal end having an inlet fluidly coupled to the supply of the surface treatment agent, the inner passage terminating at an outlet at the distal end, the outlet including one or more nozzles, the elongated rod insertable inside the hollow engine shaft; and a first sponge or brush applicator disposed at the distal end of the elongated rod adjacent the outlet, the first sponge or brush applicator engageable with the inner surface of the hollow engine shaft for applying the surface treatment agent from the supply of the surface treatment agent to the inner surface of the hollow engine shaft; and a second sponge or brush applicator disposed on the elongated rod upstream of the first sponge or brush applicator relative to a flow direction of the surface treatment agent through the elongated rod, and an axial gap between the first sponge or brush applicator and the second sponge or brush applicator, wherein the one ore more nozzles are disposed in the axial gap and aimed directly towards the first and second sponge or brush applicators for directing the surface treatment agent from the supply thereto.

2. The surface treatment device as defined in claim 1, wherein the supply of the surface treatment agent includes paint for painting the inner surface of the hollow engine shaft.

3. The surface treatment device as defined in claim 1, wherein the first sponge or brush applicator is a sponge.

4. A coating rod for applying a coating liquid to an inner surface of a hollow engine shaft, comprising:

an elongated body extending longitudinally along an axis from a first end to a second end, the elongated body sized and configured for axial insertion inside the hollow engine shaft;

an inner passage extending longitudinally through the elongated body, the inner passage having a coating inlet at the first end and a coating outlet at the second end, wherein the coating outlet includes one or more nozzles fluidly coupled to the inner passage at the second end;

a first sponge or brush applicator disposed at the second end adjacent the coating outlet; and and a second sponge or brush applicator disposed on the elongated body upstream of the first sponge or brush applicator relative to the second end, wherein an axial gap is defined between the first and second sponge or brush applicators, and wherein the coating outlet is disposed in the axial gap;

wherein the one or more nozzles are disposed in the axial gap and aimed towards the first sponge or brush applicator and the second sponge or brush applicator.

* * * * *